Henderson & Steetle.
Turning Lathe.
N° 20,794.        Patented Jul. 6, 1858.
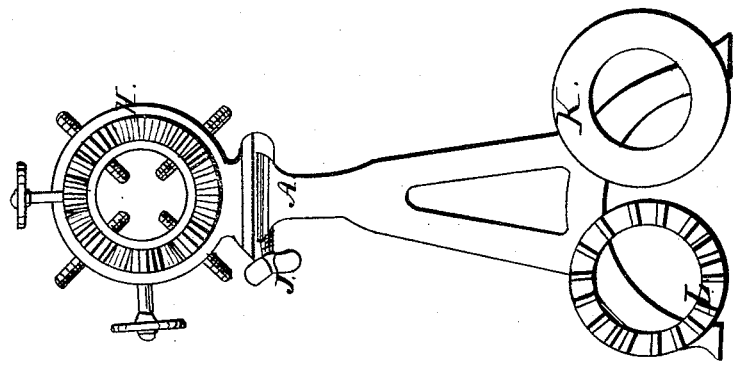
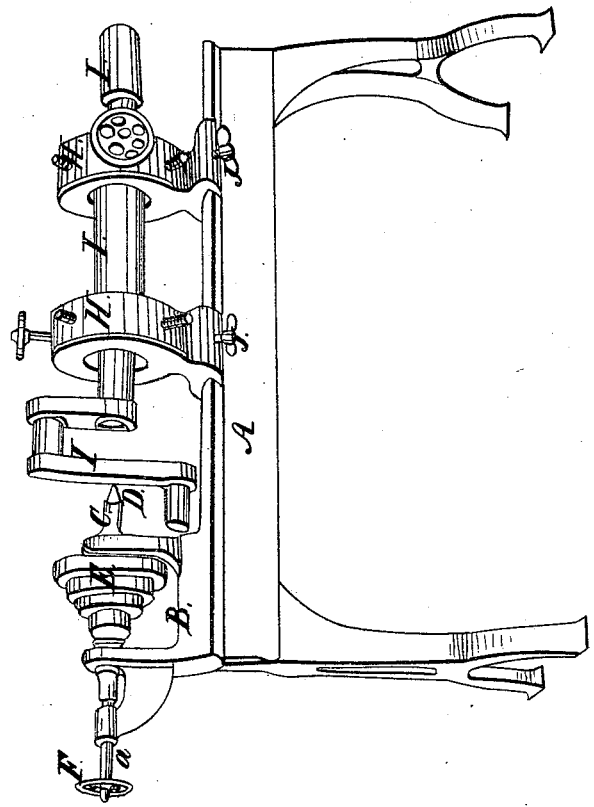

UNITED STATES PATENT OFFICE.

G. HENDERSON AND J. STEETLE, OF ALLEGHENY, PENNSYLVANIA.

LATHE FOR TURNING IN METALS.

Specification of Letters Patent No. 20,794, dated July 6, 1858.

*To all whom it may concern:*

Be it known that we, GEORGE HENDERSON and JACOB STEETLE, of the city and county of Allegheny and State of Pennsylvania, have invented a new and Improved Centering-Lathe, and that the following is a full, clear, and exact description of the same, reference being had to the annexed drawings, making a part of this specification, in which—

Figure 1 is a perspective view of our improved centering lathe. Fig. 2 is an end view showing the internal arrangement of the chucks.

Similar letters of reference indicate corresponding parts in the two figures.

This invention relates to a new and improved centering lathe for doing the kind of centering practiced by machinists in metal and consists in a novel combination and arrangement of mechanism for boring centers in line with the geometrical center of any desired part either of regular or multiform objects.

It often occurs that the object to be centered is of such form that some of its sections are eccentric to others and to be indispensable that the center be bored not concentric with the end but eccentric to it and concentric with some particular part which may be in the middle or more or less distant from the end. An object to illustrate this is shown at I, I, I, Fig. 1 of the drawing. This adaptation of the centers to any required section of the object has been heretofore effected by tedious manual processes. We effect it by supporting the object by the part with which the centers are desired to be bored in adaptation in one of two chucks which are combined with a lathe and at some other part in the second chuck while a revolving boringtool arranged to move in a line with which each chuck is made concentric is forced into contact with the object.

To enable others skilled in the art to make and use our invention we will proceed to describe its construction and operation.

A represents the shear of the lathe which may be made in the usual manner and provided with a head B in which a spindle C holding a boringtool D revolves and slides by means of the cone pulley E and handlewheel and screw F and G.

HH represent two chucks, made to slide freely on the shear A and be concentric with a geometrical line parallel with the shear A extending through the center of the boringtool D and spindle C.

K and L represent the cover and drivingwheel of the chuck H removed to show the internal arrangement.

The operation will be readily seen. The object to be centered as shown at III is grasped by the parts with which the centers are required to be bored in adaptation in the two chucks HH. To prevent the chucks receding from the pressure of the boringtool they are fixed by means of the set screws JJ. The handlewheel F being turned the spindle C advances the boringtool D into contact with the object III and bores a center in line with the geometrical centers of the parts supported in the chucks without regard to the form of the other parts of the object.

Having thus described our invention what we claim as new and desire to secure by Letters Patent is—

The combination of the two chucks HH with a lathe the whole being constructed and operated in the manner herein specified.

This invention is designed to operate in metal.

GEORGE HENDERSON.
JACOB STEETLE.

Witnesses:
  J. STUCKRATH,
  LEWIS STUCKRATH.